No. 749,603. PATENTED JAN. 12, 1904.
J. BARNES.
GROOVE CUTTER.
APPLICATION FILED FEB. 12, 1903.
NO MODEL. 2 SHEETS—SHEET 1.

Witnesses:
E. Behel.
J. S. Clark

Inventor:
John Barnes
By A. O. Behel
Atty

No. 749,603. PATENTED JAN. 12, 1904.
J. BARNES.
GROOVE CUTTER.
APPLICATION FILED FEB. 12, 1903.
NO MODEL. 2 SHEETS—SHEET 2.
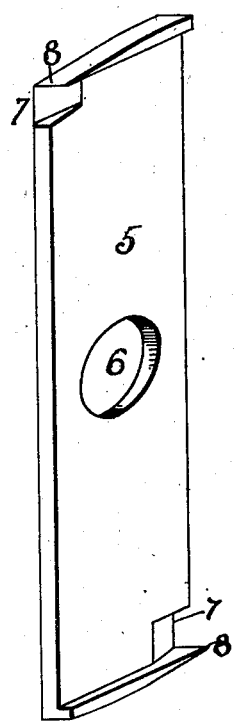
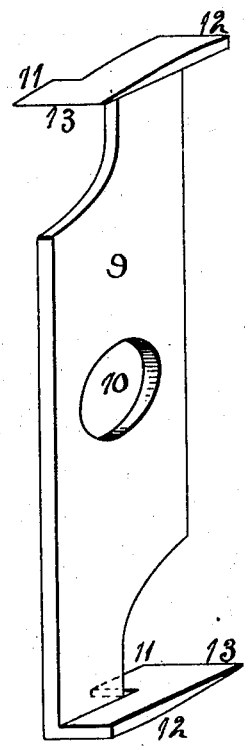
Witnesses:
Eo. Behel.
J. S. Clark.
Inventor:
John Barnes
By A. O. Behel
Atty.

No. 749,603.

Patented January 12, 1904.

UNITED STATES PATENT OFFICE.

JOHN BARNES, OF ROCKFORD, ILLINOIS, ASSIGNOR TO W. F. & JOHN BARNES COMPANY, OF ROCKFORD, ILLINOIS, A CORPORATION OF ILLINOIS.

GROOVE-CUTTER.

SPECIFICATION forming part of Letters Patent No. 749,603, dated January 12, 1904.

Application filed February 12, 1903. Serial No. 143,153. (No model.)

*To all whom it may concern:*

Be it known that I, JOHN BARNES, a citizen of the United States, residing at Rockford, in the county of Winnebago and State of Illinois, have invented certain new and useful Improvements in Groove-Cutters, of which the following is a specification.

The object of this invention is to construct a groove-cutter made up of a series of cutters adjustable on a spindle and held spaced by washers in order that grooves of different widths may be cut.

Figure 2:
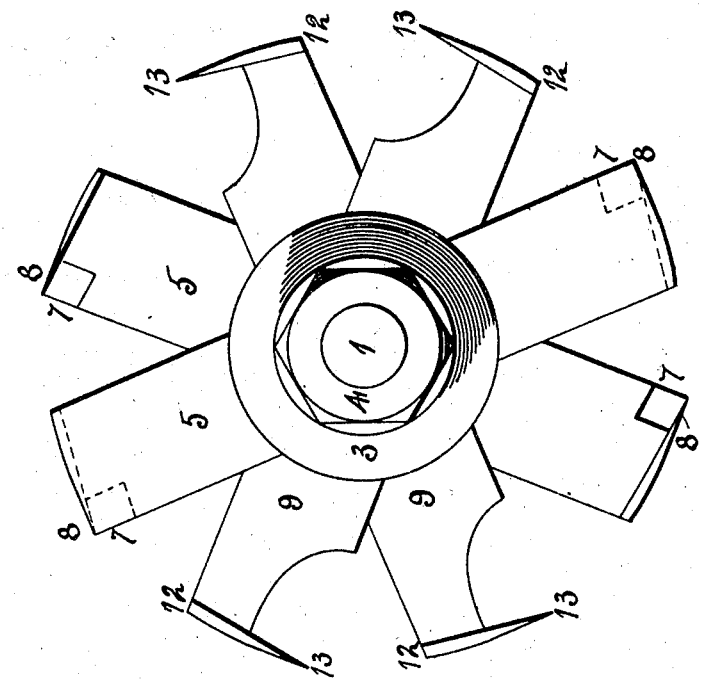
Figure 1:
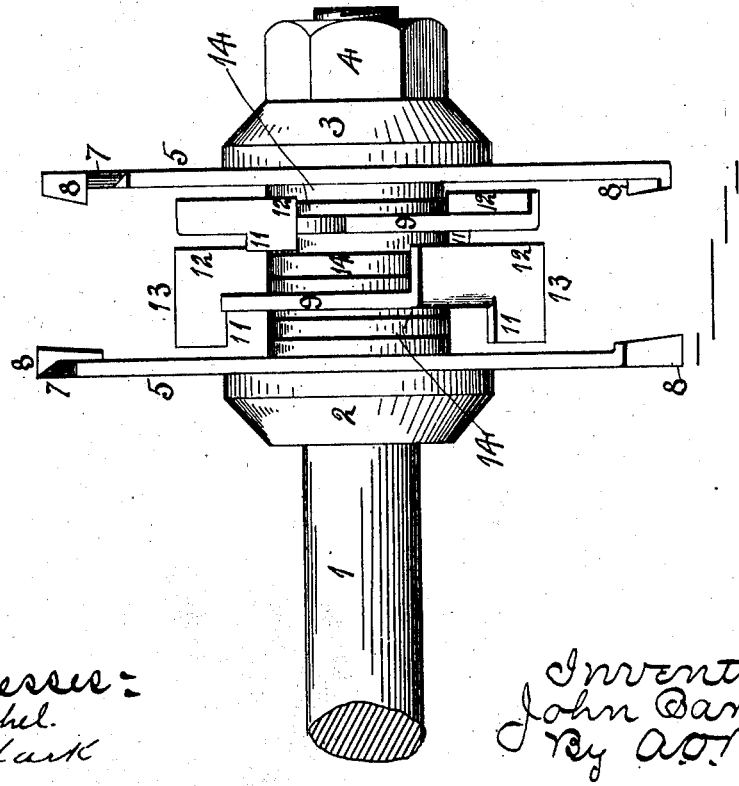

In the accompanying drawings, Figure 1 is an edge view of my improved cutter. Fig. 2 is an end view. Fig. 3 is an isometrical representation of one of the edge cutters. Fig. 4 is an isometrical representation of one of the center surface-cutters.

A spindle 1 has a shoulder 2, a collar 3, and a clamping-nut 4.

Two edge cutters are employed, each made from bar material having the main portion 5 provided with an opening 6, fitted to receive the spindle, two side cutters 7, and two surface-cutters 8.

The center surface-cutters comprise a main portion 9, provided with an opening 10, fitted to receive the spindle. The ends of the main portion are bent transversely thereof and extend each side of the main portion forming the wings 11 and 12, having the sharpened edge 13.

A variety of center surface-cutters having cutting edges of different widths can be used in the make-up of a wide cutter, as will be shown.

Should it be desirable to cut the narrowest groove, the two edge cutters are placed on the spindle, so that their center portions rest in contact and are clamped in this position by the collar 3 and nut 4. A washer or series of washers 14 can be placed on the spindle between the edge cutters and spaced the proper distance apart to cut a wider groove. If it is desirable to cut a groove wider than the edge cutters will cut, a surface-cutter is placed over the spindle between the edge cutters and properly spaced by washers, as shown at Fig. 1, and by the employment of washers of proper thicknesses a groove can be cut nearly equal to the combined with of the two edge cutters and the center surface-cutters. Additional surface-cutters can be placed on the spindle until sufficient to cut the required width of groove.

By making the surface-cutters with the cutting edge 13 extending across the blade or main portion the cutter can be adjusted on the spindle to cut its full width or may be made to overlap the edge cutters or other surface-cutters, thereby diminishing the width of the groove cut.

By the employment of the two edge cutters and a series of center surface-cutters grooves varying in width may be produced from that cut by the two edge cutters up to that cut by the combination of all the cutters, and it will only be necessary to have a set of these cutters to meet the requirement of ordinary work.

I claim as my invention—

A groove-cutter comprising a spindle and two end cutters mounted thereon, each end cutter comprising a flat bar having integral right-angular extensions at its opposite ends, said extensions extending in the same direction and the front edge of each being sharpened to provide surface-cutters at opposite ends of the bar and the opposite edges of each bar adjacent to said extensions being also sharpened to provide edge cutters at right angles to the said surface-cutters, the said edge and surface cutters at opposite ends of the bar facing in opposite directions, a center surface-cutter mounted upon the spindle between the two end cutters, said center surface-cutter comprising a flat bar having its opposite ends extending at right angles to the plane of the bar, and projecting beyond each side thereof, an edge at each end of the bar being sharpened and said sharpened edges facing in opposite directions, and means for clamping the said bars upon the spindle.

JOHN BARNES.

Witnesses:
 A. O. BEHEL,
 E. BEHEL.